United States Patent Office 3,072,442
Patented Jan. 8, 1963

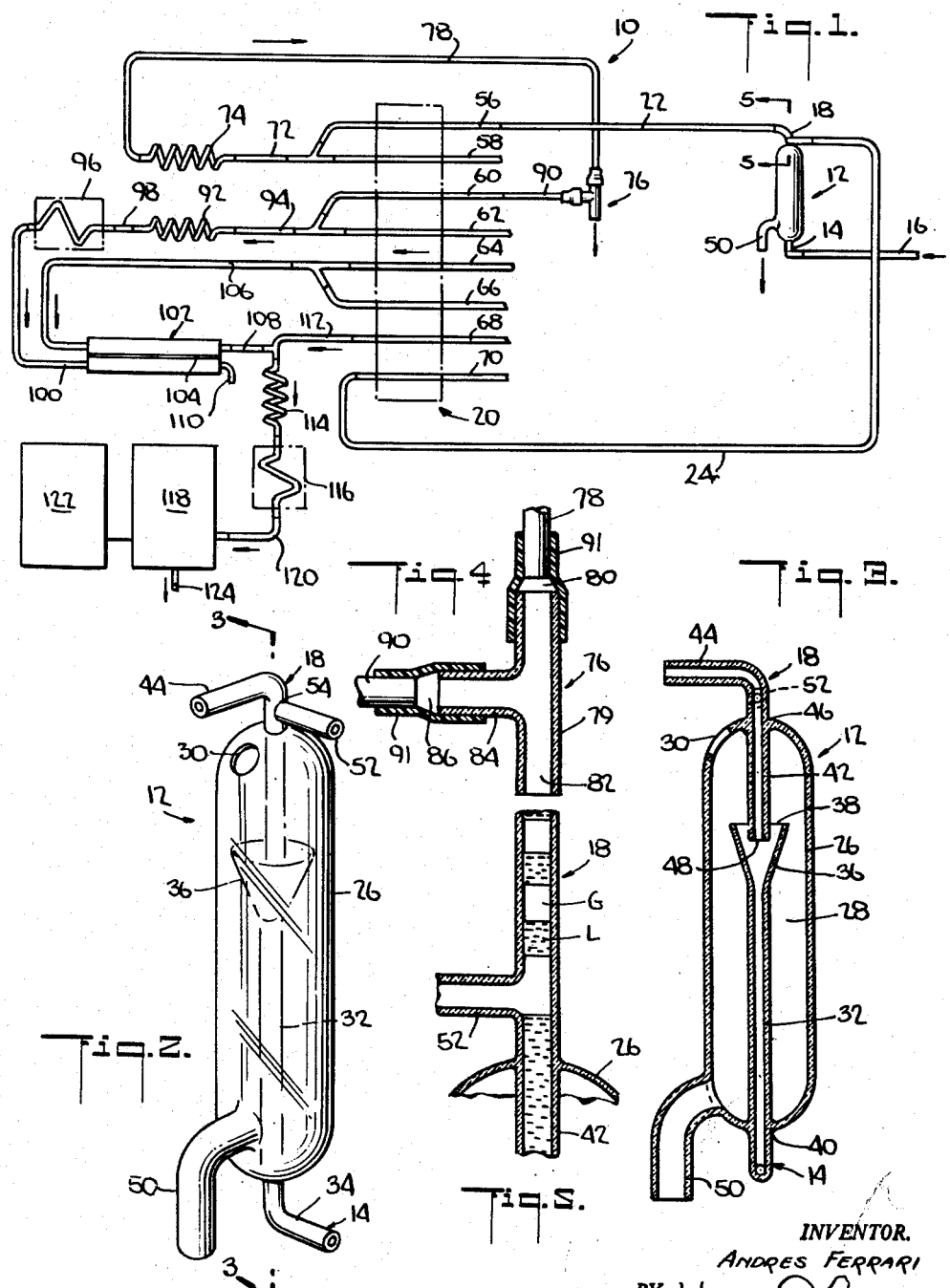

3,072,442
APPARATUS FOR TREATING LIQUIDS
Andres Ferrari, Scarsdale, N.Y., assignor to Technicon Instruments Corporation, Chauncey, N.Y., a corporation of New York
Filed Oct. 30, 1959, Ser. No. 849,785
8 Claims. (Cl. 302—14)

This invention relates to analysis, processing, or monitoring, etc., of various liquids containing finally divided solid materials, for example, but without limitation, the analysis of waste liquid in sugar manufactories in respect to the sugar content of such waste liquid.

During the treatment for analysis of various liquids containing finely divided materials, for example, diatamaceous earth from filters in sugar manufacturing processes, the finely divided materials may settle out during the course of the flow of the liquids through the treatment apparatus or system. Such settling out of the finely divided materials may result in clogging of the various parts of the apparatus or system resulting in interference with the analysis, processing, or monitoring, etc., which the liquid is undergoing. Where the treatment apparatus contains conduits having tubular passages of very small diameters, for example, diameters in the order of about 0.030 inch to 0.110 inch, clogging of the conduits is a serious problem. The interference cause by such clogging will often cause inaccuracies in analysis and treatment and may result in shutting down of the apparatus or system. In addition, in certain processes or treatments of liquids containing finely divided materials it may be necessary, for various other reasons, to prevent the settling out of the finely divided material from the liquid during the flow thereof.

In treatment apparatus of the type employed, air or other suitable inert gaseous fluid is introduced into the liquid stream to divide the stream of liquid into segments of liquid spaced from each other by intervening segments of gas for the purpose, among other things, of preventing particles contained in the liquid from adhering to the inner walls of tubular passages through which the liquid flows. In the case of finely divided solid particles it was found that, notwithstanding the introduction of air for the purposes just stated, it was not entirely effective to prevent the settling out of the finely divided material and the deposit thereof in the tubular passages with the result that clogging of the tubular passages sometimes occurred. This difficulty was eliminated pursuant to the present invention by the introduction of air or other inert gas in such a way as to form a segmented fluid stream before the finely divided material had an opportunity to commence to settle out in the tubing or passages thereof.

It is an object of the present invention, therefore, to provide in an apparatus or system for treating liquids containing finely divided materials method of and means for preventing the settling out of such material during the course of flow of the liquids through the apparatus or system.

Another object is to provide an improved liquid supply device to facilitate the supply of sample liquid in the treatment system of the above indicated character.

A further object of the invention is to provide, in an apparatus or system of the above indicated type in which a segmented fluid stream is supplied and wherein such fluid stream is diluted at an early or preliminary stage in the process, with means for separating from the stream of fluid so treated a portion thereof with a concomitant elimination of a substantial portion of the stream from the system whereby to reduce the quantity of liquid thereafter subject to further treatment for analysis without, however, impairing the segmentation of the separated portion of the stream. Further, in this connection, an object of the invention is to remove from the segmented stream a substantial quantity of the finely divided material at an early stage in the treatment of the liquid for analysis.

The above and other objects, features and advantages of the present invention will be fully understood from the following description of the invention considered in connection with the accompanying illustrative drawings.

In the drawings:

FIG. 1 is a more or less diagrammatic view of a liquid treatment apparatus or system embodying the present invention;

FIG. 2 is a perspective view, on a larger scale, of a liquid supply device pursuant to the present invention which is used in the apparatus or system of FIG. 1;

FIG. 3 is a vertical sectional view taken on line 3—3 of FIG. 2;

FIG. 4 is a vertical sectional view, on a larger scale, of a separating device pursuant to the present invention which is used in the apparatus or system of FIG. 1; and FIG. 5 is a detail fragmentary sectional view, on a larger scale, taken on lines 5—5 of FIG. 1, illustrating the formation of gas and liquid segments pursuant to the present invention.

Referring now to the drawings in detail and particularly to FIG. 1 thereof, the liquid treatment apparatus or system 10 comprises a liquid supply device 12 which is provided with a liquid inlet 14 for receiving sample liquid containing finely divided material transmitted through a conduit 16, from a source not shown, and with a liquid outlet 18 for transmitting a portion of the sample liquid to the treatment apparatus. A proportioning pump 20 or some other suitable pump is provided for aspirating the portion of the liquid sample from supply device 12, via conduit 22 to the treatment apparatus and the pump has provision for transmitting a stream of air or other inert gaseous fluid to the aspirated sample liquid stream, via conduit 24, to divide the stream into liquid and gaseous fluid segments as will be fully explained hereinafter.

As best seen in FIGS. 2 and 3, the liquid supply device 12, which is preferably made of glass, comprises a tubular member 26 which forms a chamber 28 and is provided with a vent opening 30 therein for venting the chamber. The previously mentioned inlet 14 comprises a tubular member 32 having a nipple part 34 at the lower end thereof, which is connected to conduit 16 in fluid flow communication therewith, and a flared cone-shaped part 36 at the upper end thereof, flared part 36 being provided at its top with an opening 38 which constitutes a liquid inlet for chamber 28. Tubular member 32 is secured to member 26 and is preferably integral therewith, as at 40, with nipple 34 disposed externally of the chamber 28 and the vertically extending part of tubular member 32 being concentrically disposed within chamber 28, as shown.

The previously mentioned liquid outlet or aspirating tube 18 comprises a tubular member 42 which is provided with a nipple part 44 at the upper end thereof. Nipple 44 is disposed externally of chamber 28, and is connected to conduit 22 in fluid flow communication therewith. The outlet 18 is secured to member 26 and is preferably integral therewith, as at 46. Below connection 46 the outlet 18 comprises a vertically extending tube which is in vertical alignment with the vertically extending part of tubular member 32 and is provided at its end with an opening 48 which is disposed within flared part 36 and below the top opening 38 thereof. Opening 48 constitutes a liquid inlet for transmitting liquid pumped from chamber 28 and, more particularly, from the flared part 36 of inlet 14. Since opening 48 is below opening 38 and therefore below the level of the liquid in inlet 14, air will not be introduced into the liquid through opening 48 as the liquid is aspirated from the chamber.

From the foregoing it will be seen that as pump 20 is operated a portion of the liquid entering chamber 28, via inlet 14, will be aspirated therefrom, via outlet 18, and transmitted to the liquid treatment apparatus via conduit 22. The remaining quantity of liquid entering chamber 28 through inlet 14 will overflow at opening 38 into the chamber and be discharged therefrom via auxiliary outlet 50 provided in member 26.

Pursuant to one aspect of the present invention, the liquid stream passing out of the supply device 12 through outlet 18 is treated by introducing air or other inert gaseous fluid therein to prevent the settling out of the finely divided material contained therein during the course of flow of the liquid stream through the treatment apparatus. The air or other gaseous fluid is introduced at a point in the flowing liquid stream before the finely divided material therein has an opportunity to commence to settle out. More particularly, the gaseous fluid is introduced into the flowing stream before the stream reaches the pump 20 and preferably while the stream is flowing in a vertical direction and for this purpose a nipple 52 is connected to outlet 18, in fluid flow communication therewith, as at 54, and it will be noted that this connection is at the upper vertically extending part of tubular member 42 and is below the turn at the nipple part 44 thereof. While the liquid stream is flowing in a vertical direction the finely divided material therein has no opportunity to settle out. If desired, nipple 52 may be made integral with tubular member 42 and is connected to conduit 24 in fluid flow communication therewith so that air or other gaseous fluid, supplied to pump tube 70, may be transmitted by the pump through the conduit and introduced into the vertically flowing liquid stream exiting from chamber 28 via outlet 18.

As best seen in FIG. 5, the introduction of air or other gaseous fluid into the vertically flowing liquid stream divides the stream into a series of liquid segments L separated from each other by a series of intervening gaseous fluid segments G to form a flowing segmented fluid stream in which the finely divided materials in the liquid segments L do not settle out during the flow of the segmented stream.

Pump 20 may be of the proportioning type similar to the pump shown in U.S. Patent No. 2,893,324, issued to the assignee of the present invention. Such pump comprises a plurality of resilient flexible tubes, such as the tubes indicated by reference numerals 56, 58, 60, 62, 64, 66, 68 and 70. The tubes are simultaneously and progressively compressed along their lengths against a platen by a plurality of rollers which move longitudinally along the tubes to pump proportional quantities of fluids therethrough, depending upon the internal diameter or lumens of each of the tubes and the linear speed of the rollers longitudinally of the tubes. The tubes have internal diameters which may be the same or different, according to the required metering of the fluids pumped therethrough, respectively, but have the same wall thickness in order that they may be fully compressed simultaneously by the pressure rollers irrespective of the internal diameters of the tubes. Since the pump does not per se form part of the invention and since any suitable pump may be used a more detailed description of the pump is unnecessary.

The segmented fluid stream aspirated from the liquid supply device 12 by the action of pump 20 will flow through conduit 22 and pump tube 56 and the segmented stream may join a diluent stream pumped through pump tube 58 to dilute the liquid aspirated from the supply device and reduce the concentrations of the various solid materials therein. The diluted segmented fluid stream flows through conduit 72 and a helical mixing coil 74, preferably made of glass, wherein the diluent in each liquid segment is mixed with the liquid of the segment so that the liquid and the diluent in each liquid segment of the segmented stream are thoroughly mixed together in the respective segment. From the mixing coil the diluted segmented fluid stream flows to a separating device 76, via conduit 78.

It will be understood that the quantities of the liquids necessary for transmission to the treatment apparatus for analysis are very small and, accordingly, the internal diameters of the pump tubes and conduits of the apparatus are very small, for example, in the order of 0.030 to 0.110 inch. Since the segmented stream is diluted to reduce the concentration of the various solid materials therein such dilution results in an increase in the quantity of the sample fluid stream. Accordingly, it is necessary to reduce the quantity of liquid subject to further treatment for analysis without, however, impairing the segmentation of the stream. Concomitantly with this reduction a substantial part of the finely divided material contained in the segmented fluid stream is removed therefrom. This is accomplished by the separating device 76.

Referring now to FIGS. 1 and 4, separating device 76 comprises a T-shaped tubular member, preferably made of glass, with the crossbar 79 thereof being provided with an inlet 80 and an auxiliary outlet 82. The leg 84 of the tubular member is provided with an outlet 86. Inlet 80 is connected to conduit 78, in fluid flow communication therewith, and outlet 86 is connected to conduit 90, in fluid flow communication therewith, couplings 91 being provided to effect each of the aforesaid connections. The inlet 80 is larger than outlet 86 so that the rate of flow through the inlet is greater than the rate of flow through the outlet. Accordingly, with crossbar 79 of the separating device 76 disposed in a vertical position, as shown, a portion of the liquid in the segmented fluid stream entering inlet 80 will be separated from the stream and concomitantly with this separation a substantial part of the finely divided material in the stream will be removed therefrom and discharged to waste through auxiliary outlet 82 without impairment of the segmentation of the incoming fluid stream. The remaining portion of the segmented stream will be aspirated from separating device 76, via outlet 86, by the action of pump 20 and will be transmitted to the other parts of the treatment apparatus via conduit 90 and pump tube 60, which is in fluid communication with conduit 90, for further treatment in accordance with the particular analysis of the liquid desired.

Referring now to the use of the method and apparatus of the present invention with respect to determining the quantities of total sugars contained in waste and sewer waters in sugar manufactories, the liquid sample is transmitted to liquid supply device 12, via conduit 16, and a portion thereof is aspirated from device 12 through outlet 18 by the action of pump 20. Since the liquid sample contains finely divided material, as for example diatomaceous earth from filters of the sugar manufactory, the liquid stream is segmentized before the diatomaceous earth material has an opportunity to settle out, by transmitting air or other inert gaseous fluid to the aspirated liquid stream via conduit 24, the air or other gaseous fluid being supplied to pump tube 70, as previously explained. The air or gaseous fluid is introduced into the vertically flowing stream through nipple 52, as previously described, and the segmented fluid stream is transmitted via conduit 22 and pump tube 56 to conduit 72 where it joins a stream of a diluent, such as water, supplied to pump tube 58.

The joined segmented fluid stream is transmitted to helical mixing coil 74 where the diluent is thoroughly mixed with the liquid segments L of the segmented fluid stream and the concentrations of the various materials in the liquid are reduced. From the mixing coil 74, the mixed and diluted segmented fluid stream is transmitted to separating device 76 and, as previously described, a portion of the stream is separated and discharged through auxiliary outlet 82 and concomitantly with this separation a subtsantial part of the finely divided material in the fluid stream is also discharged through the auxiliary outlet without impairment to the segmentation of the stream. The remaining portion of the segmented fluid stream is aspirated from device 76, via outlet 86 thereof, and is transmitted to pump tube 60, via conduit 90, and joins a stream of a suitable acid, as for example a 0.25 N solution of hydrochloric acid (HCl), supplied to pump tube 62. The segmented fluid stream containing the acid is then transmitted to a helical mixing coil 92, via conduit 94, wherein the acid is thoroughly mixed with the liquid segments of the stream. From the mixing coil the mixed stream is transmitted to a heating bath 96, operated preferably at a temperature of 95° C., via conduit 98. In the heating bath, the liquid sample is hydrolized to invert the non-reducing sugars contained in the waste and sewer water samples to reducing sugars, the treatment of the sample being for the determination of the total quantities of the sugars contained therein.

From the heating bath the hydrolized and segmented fluid stream is transmitted, via conduit 100, to the tubular passage of a dialyzer 102 at the lower side of the dialyzer membrane 104 thereof. The dialyzer may be of the type shown and described in U. S. Patent No. 2,864,507 issued to the assignee of the present invention. The dialyzer membrane acts to hold back contaminants found in the sample waste and sewer waters and provides a convenient and advantageous means to diffuse at least a portion of the total sugars contained in the liquid sample, the quantities of the sugars diffused being in porportion to the quantities contained in the liquid sample.

Concurrently with the transmission of the hyrdolized liquid sample to the dialyzer a color processing fluid is transmitted to the dialyzer at the upper side of the dialyzer membrane, via conduit 106, to provide a diffusate liquid into which some of the sugars contained in the waste and sewer water sample diffuse. The color processing fluid is, for example, a 0.1 percent solution in water of potassium ferricyanide ($K_3Fe(CN)_6$) and is supplied to pump tube 64, air being supplied to pump tube 66 for segmentizing the stream of potassium ferricyanide. The quantity of potassium ferricyanide employed is not critical but enough potassium ferricyanide should be used for the reduction thereof to potassium ferrocyanide by all of the diffused sugars contained in the sewer or waste liquids being analyzed, and leave a residual amount of potassium ferricyanide which is measured and is indicative of the sugar present.

The diffusate stream which is segmented and contains potassium ferricyanide and the sugars which diffused therein through the dialyzer membrane is transmitted from the dialyzer via conduit 108, the fluid sample stream being discharged to waste from the dialyzer, via outlet 110.

A suitable alkali, such as, for example, a 0.3 N solution of sodium hydroxide is supplied to pump tube 68 and transmitted by the action of the pump through conduit 112 where it joins the segmented stream containing the diffused sugars and the potassium ferricyanide solution. The alkali neutralizes any excess acid existing in the sample fluid stream due to the introduction of the acid reagent for the hydrolyzing phase of the treatment process.

The segmented sample fluid stream containing diffused sugars, potassium ferricyanide and sodium hydroxide is transmitted to a helical mixing coil 114, where the constituents of the stream are thoroughly mixed, and then to a heating bath 116, preferably operated at a temperature of 95° C., wherein the sugars in the fluid stream react with the potassium ferricyanide to reduce said potassium ferricyanide, which is yellow in color, to potassium ferrocyanide which is colorless, the amount of the color change being proportional to the quantities of the sugars contained in the waste and sewer waters.

The reacted fluid stream is then transmitted to a flow suvette type colorimeter 118, via conduit 120, where the color change is measured and recorded by recorder 122 which is operated under the control of the colorimeter in a well known manner. Since the colorimeter and recorder are well known devices and do not, per se, form part of the invention, a more complete description thereof is not considered necessary.

The following is a preferred but non-limitative example of the proportions of fluids flowing in some of the conduits of the apparatus and supplied by proportioning pump 20 for determining the quantities of sugars contained in the waste and sewer waters. The sample liquid stream aspirated from liquid supply device 12 is pumped through conduit 22 at the rate of 0.70 ml. per minute; the air or other inert gas for segmentizing the aspirated sample liquid stream is pumped through tube 70 and conduit 24 at the rate of 0.52 ml. per minute; the water for diluting the segmented sample liquid stream is pumped through tube 58 at the rate of 2.5 ml. per minute; the separated segmented sample liquid stream is aspirated from separating device 12, via conduit 90, at the rate of 1.5 ml. per minute; the 0.25 N solution of hydrochloric acid is pumped through tube 62 at the rate of 1.5 ml. per minute; the 0.1% solution in water of potassium ferricyanide is pumped through tube 64 at the rate of 2.0 ml. per minute; the air for segmentizing the stream of potassium ferricyanide is pumped through tube 66 at the rate of 1.0 ml. per minute; and the 0.3 N solution of sodium hydroxide is pumped through tube 68 at the rate of 1.5 ml. per minute.

A fluid treatment apparatus for determining the quantities of total sugars in waste and sewer waters having some of the features shown herein is illustrataed and described in my copending application, Serial No. 799,884 filed March 17, 1959, which is assigned to the assignee of the present invention.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In an apparatus or system for treating a stream of liquid containing finely divided material; conduit means, pump means for transmitting said liquid stream through said conduit means at one rate of flow, a chamber having a liquid inlet and a liquid outlet, said liquid inlet being in fluid flow communication with said conduit means, pump means in fluid flow communication with said liquid outlet for pumping liquid in the form of a stream from said chamber at a rate of flow which is less than said one rate so that excess liquid is formed in said chamber, and means for introducing a gaseous fluid stream into said pumped liquid stream from said chamber in a quantity sufficient to divide said pumped liquid stream into liquid segments separated from each other by intervening segments of gaseous fluid, whereby the finely divided material in said pumped liquid stream is prevented from settling out during the flow thereof through the apparatus, said chamber being provided with an auxiliary liquid outlet for the discharge of said liquid in excess of the quantity of liquid pumped from said chamber through said first mentioned liquid outlet.

2. A liquid supply device for a liquid treatment apparatus or system, comprising a tubular member forming a chamber and having a vent opening, said chamber having an inlet part for receiving a liquid and an outlet part for discharging liquid therefrom, said inlet part comprising a tubular member having a part thereof disposed within said chamber and provided with an opening for discharging excess liquid into said chamber, said outlet part comprising a tubular member having a part thereof disposed within said chamber and provided with an opening disposed within said inlet part opening for withdrawing liquid therefrom.

3. A liquid supply device for a liquid treatment apparatus or system, comprising a tubular member forming a chamber and having a vent opening, said chamber having an inlet part for receiving a liquid and an outlet part for discharging liquid therefrom, said inlet part comprising a tubular member having a part thereof disposed within said chamber and provided with an opening for discharging excess liquid into said chamber, said outlet part comprising a tubular member having a part thereof disposed within said chamber and provided with an opening disposed within said inlet part opening for withdrawing liquid therefrom, said outlet part opening being below the top of said inlet part opening and below the level of the liquid therein to prevent the intake of air with said withdrawing of the liquid in said inlet part opening.

4. A liquid supply device for a liquid treatment apparatus or system, comprising a tubular member forming a chamber, said chamber having an inlet part for receiving a liquid and an outlet part for discharging liquid therefrom, said inlet part comprising a tubular member having a part thereof disposed within said chamber and provided with an opening for discharging excess liquid into said chamber, said outlet part comprising a tubular member having a part thereof disposed within said chamber and provided with an opening disposed within said inlet part opening for withdrawing liquid therefrom, said chamber being provided with an auxiliary liquid outlet for discharging liquid in excess of the quantity of liquid withdrawn from said chamber.

5. A liquid supply device for a liquid treatment apparatus or system, comprising a tubular member forming a chamber and having a vent opening, said chamber having an inlet part for receiving a liquid and an outlet part for discharging liquid therefrom, said inlet part comprising a tubular member having a part thereof disposed within said chamber and provided with an opening for discharging excess liquid into said chamber, said outlet part comprising a tubular member having a part thereof disposed within said chamber and provided with an opening disposed within said inlet part opening for withdrawing liquid therefrom, said outlet part being provided with a nipple part in fluid flow communication therewith for introducing a gaseous fluid stream into said liquid flowing in said outlet part.

6. A liquid supply device for a liquid treatment apparatus or system, comprising a tubular member forming a chamber and having a vent opening, said chamber having an inlet part for receiving a liquid and an outlet part for discharging liquid therefrom, said inlet part comprising a tubular member having a vertically extending part and having a part thereof disposed within said chamber and provided with an opening for discharging excess liquid into said chamber, said outlet part comprising a tubular member having a part thereof disposed within said chamber and provided with an opening disposed within said inlet part opening for withdrawing liquid therefrom, said vertically extending part being provided with a nipple part in fluid flow communication therewith for introducing a gaseous fluid stream into the liquid flowing in said vertically extending part.

7. A liquid treatment apparatus or system, comprising first conduit means for transmitting a liquid stream, second conduit means for transmitting a gaseous fluid in a quantity sufficient to divide said liquid stream into a segmented stream comprising a series of spaced liquid segments separated from each other by intervening segments of said gaseous fluid, said second conduit means having an outlet for said gaseous fluid for introducing the latter into said liquid stream to thereby form said segmented stream, said outlet of said second conduit means being in fluid flow communication with said first conduit means at a point adjacent the point at which said liquid is introduced into said first conduit means, third conduit means located downstream of said adjacent point at which said gaseous fluid is introduced into said first conduit means, separating means in fluid flow communication with said first conduit means downstream of said adjacent point for separating a portion of the liquid from said segmented stream, said third conduit means being in fluid flow communication with said separating means for transmitting the remaining fluid of said segmented stream from said separating means, and pump means positioned downstream of said adjacent point at which said gaseous fluid is introduced into said first conduit means and positioned downstream of said separating means for transmitting said liquid and said gaseous fluid through said first and second conduit means, respectively, and for transmitting said remaining fluid of said segmented stream through said third conduit means.

8. A liquid treatment apparatus or system, comprising first conduit means for transmitting a liquid stream, second conduit means for transmitting a gaseous fluid in a quantity sufficient to divide said liquid stream into a segmented stream comprising a series of spaced liquid segments separated from each other by intervening segments of said gaseous fluid, said second conduit means having an outlet for said gaseous fluid for introducing the latter into said liquid stream to thereby form said segmented stream, said outlet of said second conduit means being in fluid flow communication with said first conduit means at a point adjacent the point at which said liquid is introduced into said first conduit means, third conduit means located downstream of said adjacent point at which said gaseous fluid is introduced into said first conduit means, separating means in fluid flow communication with said first conduit means downstream of said adjacent point for separating a portion of the liquid from said segmented stream, said third conduit means being in fluid flow communication with said separating means for transmitting the remaining fluid of said segmented stream from said separating means, and pump means positioned downstream of said adjacent point at which said gaseous fluid is introduced into said first conduit means and positioned downstream of said separating means for transmitting said liquid and said gaseous fluid through said first and second conduit means, respectively, and for transmitting said remaining fluid of said segmented stream through said third conduit means, said separating means having an inlet connected to said first conduit means downstream of said adjacent point for receiving said segmented stream and having two outlets, one of said outlets being connected to said third conduit means for transmission of said remaining fluid into said third conduit means by said pump means, said other outlet providing an outlet for the separated liquid of the segmented stream.

References Cited in the file of this patent
UNITED STATES PATENTS

| | | |
|---|---|---|
| 1,316,507 | Pollard | Sept. 16, 1919 |
| 1,466,413 | Schaanning | Aug. 28, 1923 |